United States Patent [19]

Yamamoto

[11] Patent Number: 5,208,913
[45] Date of Patent: May 4, 1993

[54] BUFFER MEMORY FOR SYNCHRONIZING DATA TRANSMISSION AND RECEPTION BETWEEN TWO DEVICES HAVING MUTUALLY DIFFERENT OPERATING SPEEDS AND OPERATING METHODS THEREFOR

[75] Inventor: Hirotoshi Yamamoto, Hiroshima, Japan

[73] Assignee: Sharp Kabushiki Kaisha, Osaka, Japan

[21] Appl. No.: 839,699

[22] Filed: Feb. 21, 1992

Related U.S. Application Data

[63] Continuation of Ser. No. 368,651, Jun. 20, 1989, abandoned.

[30] Foreign Application Priority Data

Jun. 22, 1988 [JP] Japan .............................. 63-155747

[51] Int. Cl.$^5$ ...................... G06F 13/20; G06F 13/42
[52] U.S. Cl. ................................ 395/250; 395/200; 395/275; 364/DIG. 1; 364/239.1; 364/239.3
[58] Field of Search ...................... 395/250, 650, 700

[56] References Cited

U.S. PATENT DOCUMENTS

| | | | |
|---|---|---|---|
| 4,873,703 | 10/1989 | Crandall et al. | 375/118 |
| 4,875,224 | 10/1989 | Simpson | 364/200 |
| 4,890,254 | 12/1989 | Cooley | 364/900 |

Primary Examiner—Gareth D. Shaw
Assistant Examiner—John Q. Chavis

[57] ABSTRACT

A digital audio tape recorder memory or a DAT memory includes a buffer memory for absorbing the operating speed difference between the computer and the DAT memory, and a control circuit for controlling the buffer memory. This buffer memory includes a plurality of addressable sections. The control circuit causes the input and output data to and from the computer to be written into and read out from the buffer memory to synchronize the transmission and reception between the two devices. The addressing of the buffer memory by the control circuit is controlled from section to section to simplify the control circuit.

8 Claims, 4 Drawing Sheets

BUFFER MEMORY FOR SYNCHRONIZING DATA TRANSMISSION AND RECEPTION BETWEEN TWO DEVICES HAVING MUTUALLY DIFFERENT OPERATING SPEEDS AND OPERATING METHODS THEREFOR

This application is a continuation, continuation-in-part, of application Ser. No. 07/368,651 filed on Jun. 20, 1989, now abandoned.

BACKGROUND OF THE INVENTION

1. Field of the Invention

This invention relates in general to a buffer memory connected between two devices having mutually different operating speeds, and, more particularly, to a buffer memory for absorbing the difference in the operating speeds, and an operating method therefor. This invention has particular applicability to a digital audio tape recorder memory that may be used as an auxiliary storage device for computers.

2. Description of the Background Art

In a recording reproducing apparatus for high density recording of digital signals on a magnetic recording medium, such as a digital audio tape recorder employing a rotary head, referred to hereinafter as DAT, there are recorded data simultaneously with annexed error correction codes. In case of a partial data failure or dropout in the course of data reproduction, the correction operation is performed on the basis of the error correction codes to reproduce the recorded data. This function is generally widely known as the error correction function.

The above described rotary head type DAT is used as the acoustic signal recording/reproducing apparatus per se, wherein the input acoustic signals are recorded after they are previously modulated into pulse code signals. In the recording operation, the rate of occurrence of the data modulated into the pulse codes is designed to be equal to the rate of recording thereof on the recording medium, so that no buffer memory is required for adjusting the operating speed.

However, when the recording/reproducing apparatus is used for example as the auxiliary storage for a computer, since the recording and reproducing speeds of the recording/reproducing apparatus are fixed in advance, these speeds are generally different from the operating speed of the computer, that is, the transfer rate of data inputted to or outputted from the computer. As a result, it becomes necessary to use other measures for absorbing the difference in the operating speeds.

As one of those measures, for example, for the case in which the data transfer rate of the computer is lower than the recording speed of the recording/reproducing apparatus, there is known a method consisting in apparently matching the operating speeds by writing the data inputted from the computer in the recording/reproducing apparatus in duplicate on the recording medium.

In this method, however, the recording density is necessarily lowered.

As other measures, it is known to perform the recording operation on the recording medium intermittently for absorbing the difference in the operating speeds. This method, however, is not practical in a DAT employing a rotary head in that, when the data are sequentially recorded on the recording medium by the intermittent recording operation, the feed mechanism for the recording medium is necessarily complicated.

Thus, for making use of the recording/reproducing apparatus as the auxiliary storage for a computer, it is also known to provide a buffer memory between the computer and the recording/reproducing apparatus to absorb the difference in the operating speeds of the recording/reproducing apparatus and the computer by the buffer memory.

However, in this case, when the data applied from, for example, the computer, is transferred to the recording/reproducing apparatus, this data is written in its entirety into the buffer memory, so that it is necessary to increase the storage capacity of the buffer memory. In addition, data transfer takes a lot of time.

In order to cope with this, there is proposed a method consisting in supervising the writing and reading out addresses to control the write and read out operations intermittently, as being a possibly effective method. In this case, the storage capacity required of the buffer memory may be reduced. However, there is necessitated for example a comparative operation for comparing the totality of the bits of the write and read out addresses, while there is also necessitated a control for frequently starting and stopping the write and read out operations. In short, it is not desirable to control the writing and reading out of the buffer memory by handling the totality of the address bits because the circuit configuration and control becomes complicated. This frequent start and stop control is particularly not desirable in the cases wherein the DAT is applied as the auxiliary storage in a computer system.

SUMMARY OF THE INVENTION

It is an object of the present invention to synchronize the data transmission and reception between two devices having mutually different data transfer and reception rates through the use of a buffer memory.

It is another object of the present invention to absorb the difference in speed between the two devices having mutually different transmission and reception rates through the use of a buffer memory.

It is a further object of the present invention to simplify the control in a buffer memory for absorbing the difference in the mutually different transmission and reception speeds between two devices.

It is a further object of the present invention to reduce the memory capacity required for absorbing the difference in the mutually different operating speeds between the two devices.

It is yet another object of the present invention to absorb the difference in the operating speeds between the computer system and the digital audio tape recorder memory through the use of the buffer memory.

The buffer memory device according to the present invention is connected between a first device having a first operating speed for transmission and reception and a second device having a second operating speed lower than the first operating speed for transmission and reception. This buffer memory device includes an area for data storage divided into a plurality of addressable sections, a first addressing circuitry responsive to a first rate of operation of said first device for periodically addressing each section in said area, a second addressing circuitry responsive to a second rate of operation of the second device for periodically addressing each section in said area, an accessing circuitry for performing a first accessing operation and a second accessing operation to the section addressed by said first addressing circuitry and by said second addressing circuitry, and a control circuitry responsive to the position of the sections in said memory area addressed by said first addressing circuitry and said second addressing circuitry to start and stop the operation of said second addressing circuitry.

In operation, the control circuitry controls the starting and the stopping the second addressing circuitry, responsive to the section addressed by the first addressing circuitry and the section addressed by the second addressing circuitry. The accessing circuitry accesses the sections in the memory area addressed by the first addressing circuitry and the second addressing circuitry. In this manner, data transmission and reception between the two devices is synchronized, while simultaneously simplifying the control in the control circuit.

According to a preferred embodiment, this buffer memory is provided between a computer system and a digital audio tape recorder memory for synchronizing transmission and reception between two devices.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
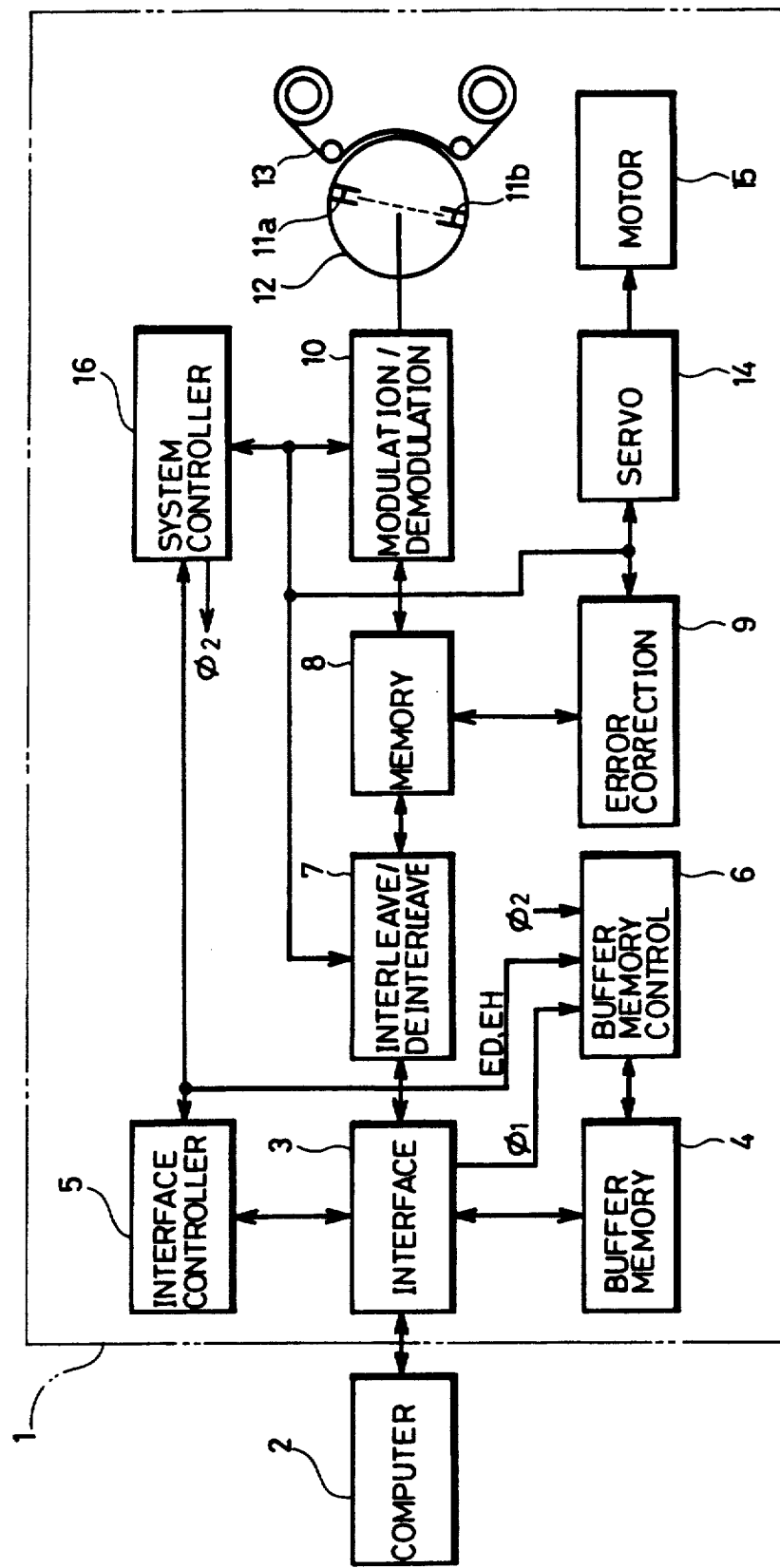
FIG. 1 is a block diagram showing a digital audio tape recorder embodying a buffer memory and a control circuit therefor according to a preferred embodiment of the present invention.

FIG. 1 is a block diagram showing a DAT 1 including a buffer memory 4 according to an embodiment of the present invention and its control circuit 6. This DAT 1 is connected to a computer 2 as an auxiliary storage. Referring to FIG. 1, this DAT 1 includes an interface circuit 3 for inputting and outputting data to and from a computer 2. The buffer memory 4 is connected to this interface circuit 3. An interface controller 5 is also connected to the interface circuit 3 for controlling the interface circuit 3. A buffer memory control circuit 6 is connected to the buffer memory 4 for controlling the buffer memory 4. Downstream of the interface circuit 3, an interleave/deinterleave circuit 7 for executing signal processing which includes interleaving and deinterleaving of digital signals supplied thereto is connected to the interface circuit 3. Downstream of the interleave/deinterleave circuit 7, there is connected a memory 8 to the interleave/deinterleave circuit 7, and an error correction circuit 9 is connected to the memory 8. The error correction circuit 9 has the function of annexing parity codes to the data outputted from the interleave/deinterleave circuit 7 to the memory 8 and correcting data failure or dropout. Downstream of the memory 8, there is connected a modulating/demodulating circuit 10 to the memory 8 for modulating data supplied from this memory 8 and demodulating record data reproduced from a magnetic tape 13 by magnetic heads 11a and 11b.

These magnetic heads 11a, 11b are provided on the outer periphery of a rotating cylinder 12 at positions 180° spaced apart from each other. The magnetic tape 13 as the recording medium is adapted to be contacted with this rotating cylinder 12 over an extent of 90°.

A servo circuit 14 controls the driving of an electric motor 15 functioning as a drive source for the rotating cylinder 12. A system controller 16 is connected to the interface controller 5, the buffer memory control circuit 6, the interleave/deinterleave circuit 7, the error correction circuit 9, the modulating/demodulating circuit 10 and the servo circuit 14 for controlling the operational timing of the DAT 1 in its entirety.

Figure 2:
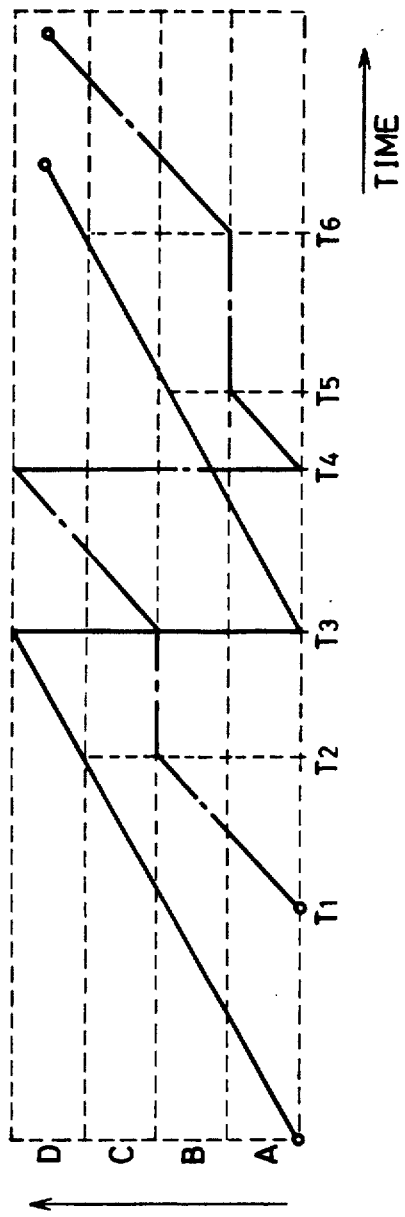
FIGS. 2 and 3 are timing charts for illustrating the write and read out operation in the buffer memory shown in FIG. 1.
Figure 3:
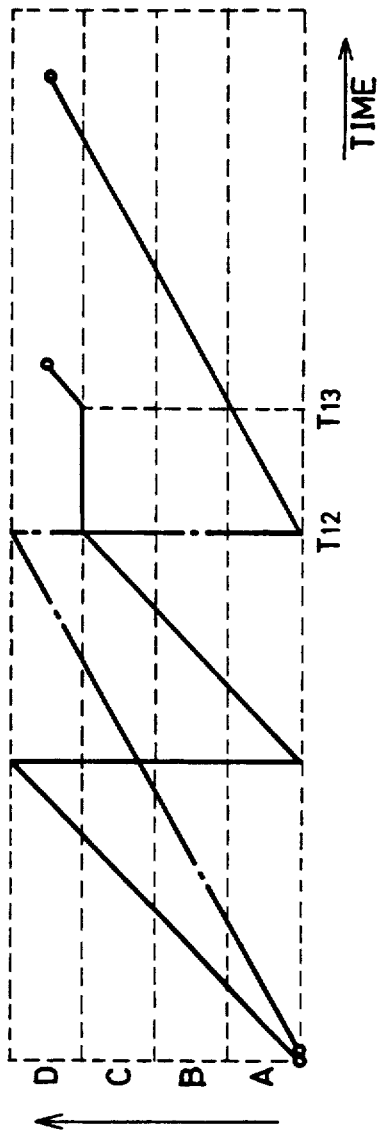

FIGS. 2 and 3 are timing charts for illustrating the operation when the data outputted from the computer 2 are recorded by the DAT 1, and when the data reproduced by the DAT 1 are outputted to the computer 2, respectively. Referring to FIGS. 1, 2 and 3, the recording and reproducing operation of the DAT 1 is explained herein-below. Generally, the speed of operation of the computer 2 is higher than that of DAT 1. However, the relation between the two is often reversed. In the following explanation, it is assumed that the operating speed of the computer 2 is lower than that of the DAT 1 so that the effect of this embodiment will be more clearly understood.

During data recording, the data outputted from the computer 2 is written sequentially into the buffer memory 4 by way of the interface 3 of the DAT 1. The buffer memory 4 has its storage area divided into a plurality of regions, herein into four regions A, B, C and D, as shown in FIG. 2. The data are written sequentially into the regions A—B—C—D in this order to be again written from the first region A on. The solid line shown in FIG. 2 indicates that the regions into which the writing is performed are shifted with the lapse of time.

At time T1, the region into which the writing is made is shifted from the region B to the region C. Simultaneously, the buffer memory control circuit 6 controls the buffer memory 4 so that the data written into the buffer memory 4 is read out sequentially from the region A in the same sequence as that for writing. The chain-dotted line in FIG. 2 shows that the read out region is shifted similarly with the lapse of time. This read out operation is performed synchronously with the rate of recording at DAT 1. In this case, the transfer rate of data transferred from the computer 2 to the buffer memory 4 is slower than the rate of recording at the DAT 1, so that the solid line has a gradient less than that of the chain-dotted line in FIG. 2.

Since the read out speed is higher than the write speed in buffer memory 4, the region in which read out is performed gradually approaches the region in which writing is performed, as the time elapses. At time T2, the region in which read out is performed coincides with the region in which writing is performed, that is, the region C. The buffer memory control circuit 6 is responsive to detection of this coincidence, which would produce an undesired addressing collision, to interrupt the read out operation. During the time interval from time T2 until time T3, only the writing operation is performed. After completion of writing into the region D, the writing region is reset at time T3 to the region A. Thus, the data in the region A is rewritten to new data after time T3. Since the read out operation has been interrupted, a difference corresponding to two domains is produced at time T3 between the read out address and the writing address. The control circuit 6 detects the generation of the difference of two domains to reinitiate the read out operation. Subsequently, at time T4, read out of the domain D is terminated, and the read out operation is reinitiated from the domain A on, in a similar manner to the writing operation.

Subsequently, by the similar sequence of operations, the read out operation is interrupted at time T5 when the read out region coincides with the write region, that is, the region B, and the read operation is reinitiated at time T6 when the difference corresponding to two domains is produced between the write address and the read out address. In this manner, the read out operation is performed at all times in the buffer memory 4 so as to follow up with the write operation.

The data read out from the buffer memory 4 is stored in the memory 8 by way of the interface 3 and the interleave/deinterleave circuit 7. In the error correction circuit 9, the parity codes are annexed to the stored data and the data thus formed is modulated by the modulating/demodulating circuit 10. The modulated signals are transferred to the magnetic heads 11a and 11b of the rotating cylinder 12. The magnetic heads 11a and 11b scan the magnetic tape 13 alternately in an inclined direction with respect to the tape running direction for recording data in each track of the magnetic tape 13.

The reproducing operation is hereinafter explained. The data reproduced by the magnetic heads 11a and 11b from the magnetic tape 13 are demodulated by the modulating/demodulating circuit 10 so as to be stored in the memory 8. The stored data are processed for error correction by the error correction circuit 9 so as to be written into the buffer memory 4 by way of the interleave/deinterleave circuit 7 and the interface 3. The written data is read out from the buffer memory 6 in synchronism with the operating speed of the computer 2 so as to be outputted to the computer 2 by way of the interface 3. Similar to the case of the recording operation, the solid line in FIG. 3 shows the shift of the write region in the buffer memory 4 with the lapse of time and the chain-dotted line therein shows the shift of the read out region with the lapse of time.

Since the operating speed of the computer 2 is lower in this case than that of the DAT 1, the relation between the writing speed and the reading out speed is reversed from that for the above described recording operation. That is, the writing speed is higher than the reading out speed. Therefore, as shown in FIG. 3, the writing operation is interrupted after time T12 at which the writing region coincides with the reading out region. When the difference between the writing address and the read out address becomes equal at time T13 to two domains, the writing operation is reinitiated. Hence there is no longer any risk that the writing data that have not been read out be rewritten to new data.

As described hereinabove, the difference in the operating speed between the computer 2 and the DAT 1 is absorbed by the buffer memory 4, so that data transfer may be made synchronously between the computer 2 and the DAT 1. As a result, there is no necessity of using a memory having a storage capacity larger than is necessary as the buffer.

Figure 4:
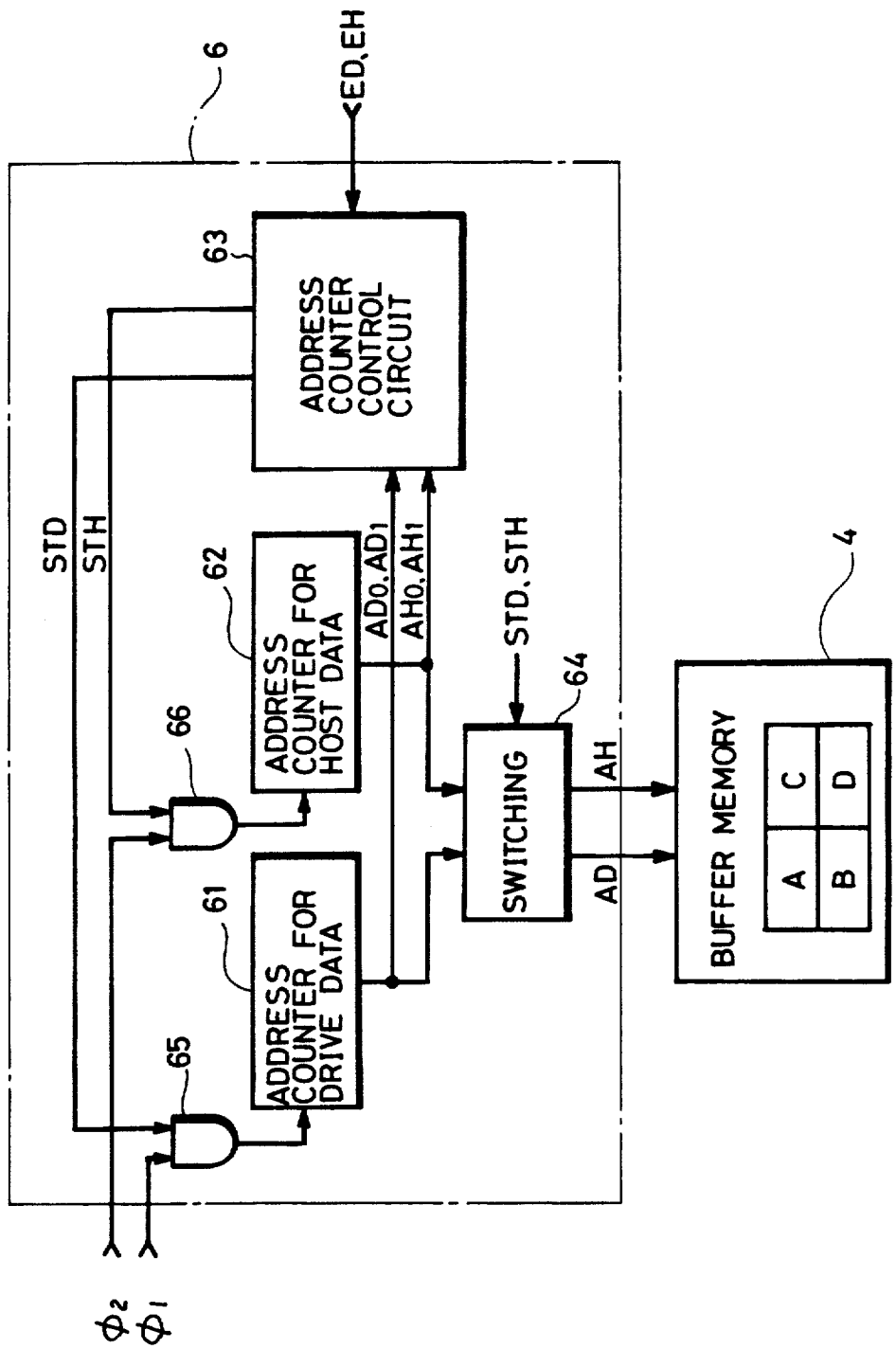
FIG. 4 is a block diagram showing an example of the buffer memory control circuit shown in FIG. 1.

FIG. 4 is a block diagram showing the control circuit for the buffer memory shown in FIG. 1. Referring to FIG. 4, this control circuit 6 includes an address counter 61 for drive data, an address counter for host data 62, a control circuit 63 for controlling these two counters 61 and 62, and a switching circuit 64 for outputting an address signal AD for drive data and an address signal AH for host data outputted from these counters 61 and 62.

Figure 5:
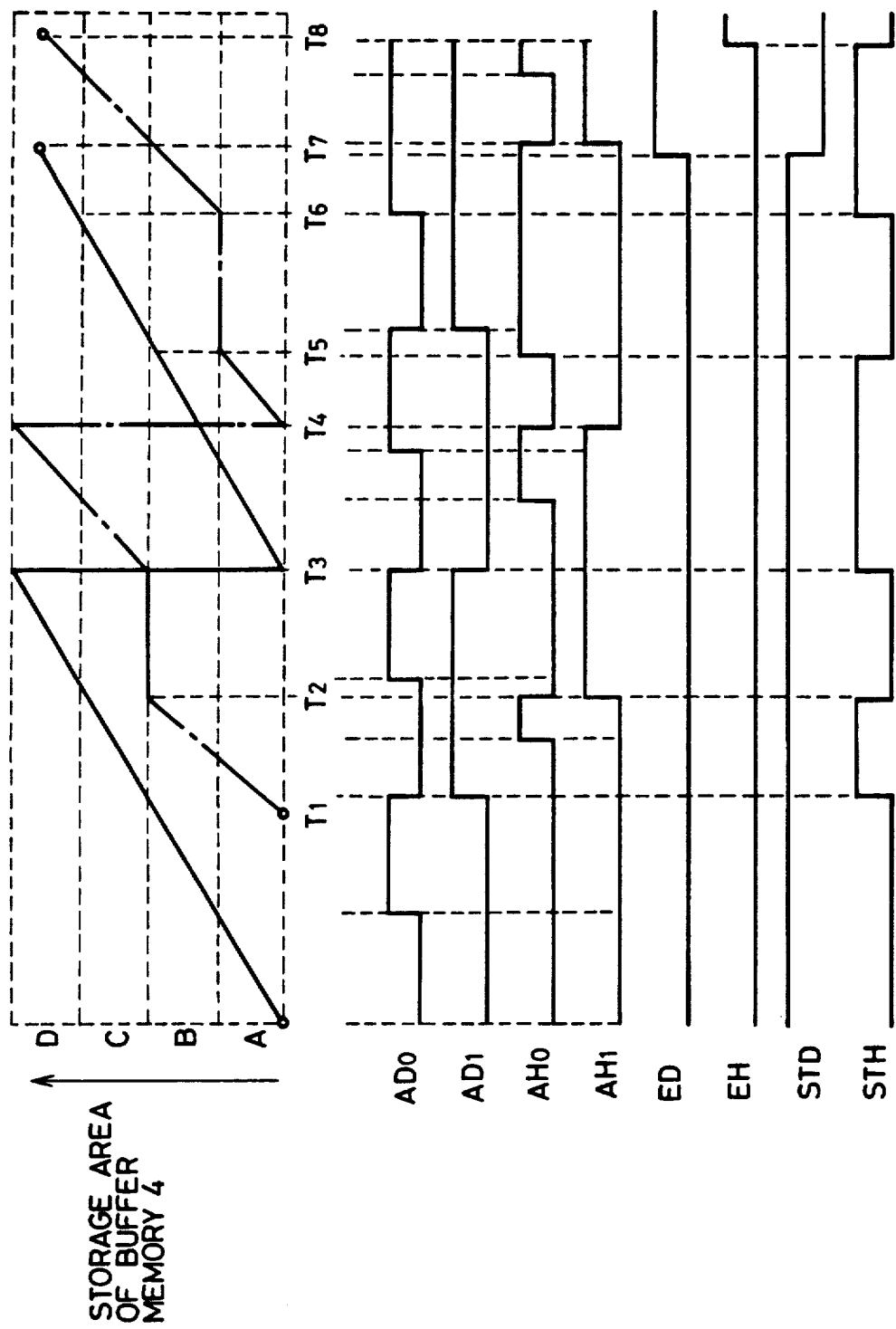
FIG. 5 is a timing chart for illustrating the operation of the circuit shown in FIG. 4.

FIG. 5 is a timing chart for illustrating the operation of the control circuit 6 shown in FIG. 4. FIG. 5 shows control signals taken charge of by the control circuit 6 when the data outputted from the computer 2 are recorded at the DAT 1. Hence, FIG. 5 includes FIG. 2 for reference. The operation is hereinafter explained by referring to FIGS. 4 and 5.

The clock signals $\phi 1$ and $\phi 2$ for driving the address counters 61 and 62 are supplied from the interface circuit 3 and the system controller 16 shown in FIG. 1, respectively. The clock signal $\phi 1$ is synchronized with the rate of data transmission and reception of the computer 2, while the clock signal $\phi 2$ is synchronized with that of the DAT memory. The address counters 61 and 62 are driven by the clock signals $\phi 1$ and $\phi 2$ supplied from the AND gates 65 and 66, respectively. Two upper order bits AD0 and AD1 of the drive address signal AD outputted from the address counter 61 are supplied to the control circuit 63 while two upper bits AH0 and AH1 of the host address signal AH supplied from the address counter 62 are also supplied to the control circuit 63.

Referring to FIG. 5, the control circuit 63 is responsive to the address signals AD0, AD1, AH0 and AH1 to output stop signal STH. Specifically, the signal STH is outputted as a result of comparing of the address signals AD0 and AD1 and the address signals AH0 and AH1. Thus, the signal STH rises during the periods T1-T2, T3-T5 and T6-T8, with the low level signal STH being outputted during the other periods. The AND gate 66 is responsive to the high level signal STH1 to transmit the supplied clock signal $\phi 2$ to the address counter 62. Thus the address counter 62 outputs, as the read out address, the address signal AH1 which increases only when the signal STH1 is at the high level. Hence, as shown in FIGS. 2 and 5, there are obtained address signals AH that are cycled between the domains A and D and that may be addressed intermittently.

On the other hand, since the high level stop signal STD is outputted from the control circuit 63 until time T1, the AND gate 65 continues to transmit the supplied clock signal $\phi 1$ to the counter 61 until time T7. Hence, there are supplied from the counter 61 the address signals AD capable of periodically addressing the domains A and D of the buffer memory 4.

The switching circuit 64 is responsive to the signals STD and STH to supply the address signals AD and AH from the counters 61 and 62 to the buffer memory 4. Thus the buffer memory receives the address signal AD and the address signal AH when the signal STD is at the high level and when the signal STH is at the high level, respectively.

At time T7, a signal ED indicating the detection of the end-of-data is supplied to the control circuit 63. Since the signal indicating the end-of-data is recorded during the data recording on the tape 13 shown in FIG. 1, the signal indicating the end-of-data is detected during reproduction from the system controller 16. Thus the system controller 16 supplies the high level signal ED to the buffer memory control circuit 6. When the signal ED rises to the high level, the writing operation is stopped at time T7 halfway in the domain D of the buffer memory 4. On the other hand, after the rising of the signal ED, the read operation is continued without being stopped even after the difference between the writing domain and the reading out domain becomes less than the two domains. Hence, after the time T7 and until the time T8, the data remaining in the domains C and D of the buffer memory 4 is read out. After the totality of the remaining data is read out, the signal EH rises at time T8 to terminate the read out operation.

In the above embodiment, the description has been made of the case of the DAT 1 employing the rotating head 1 as the auxiliary storage for the computer 2. However, the present invention may also be applied to the case of using the video tape recorder or a read only memory as the auxiliary storage.

In the above described buffer memory of the present invention, the storage region is divided into a plurality of domains and the region in which the writing is performed and the region in which the reading out is performed are addressed separately. When the addressed two domains coincide with each other, one of the writing operation and the reading out operation that has addressed the coincident domain later is discontinued. Thus the situation may be avoided in which one of the writing operation and the reading out operation be performed for the same domain before the other of the writing operation and the reading out operation is performed. Since each domain is addressed in accordance with a predetermined repetitive sequence, and the writing and reading out operations are performed there, it becomes possible to use a buffer memory having a lesser storage capacity for synchronizing the data transmission and reception between two devices having mutually different speeds of signal transmission and reception.

Hence the difference in the rates of data transmission and reception between the computer system and the DAT memory may be absorbed, so that, with the use of the buffer memory of the present invention, it becomes possible to absorb the difference of the mutually different transmission and reception speeds of the two devices, in other words, to synchronize the data transmission and reception between these two devices.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A buffer memory device connected between a first device and a second device operating at mutually different first and second rates of data transmission and reception, respectively, and adapted for synchronizing data transmission and reception between said first and second devices, wherein the first rate of said first device operates at a lower rate of data transmission and reception than the second rate of said second device, said buffer memory device comprising:

a memory area for storing data, said memory area being divided into a plurality of addressable sections;

first addressing means responsive to the first rate of said first device for periodically addressing each section in said memory area;

second addressing means responsive to the second rate of said second device for periodically addressing each section in said memory area;

accessing means connected to said memory area for performing first and second accessing operations to the section addressed by said first and second addressing means respectively; and control means for detecting a coincidence of said first and second accessing operations in the same addressable section of said memory area and a difference between the addressable sections of said memory area having said first and second accessing operations so that the operation of said second addressing means is stopped when said addressable section of said memory area and the operation of said second addressing means is subsequently started when said difference between said addressable sections is detected to be a predetermined difference corresponding to at least two addressable sections of said memory area to thereby avoid an undesired addressing collision caused by simultaneous addressing by said first and second addressing means in the same addressable section of said memory area.

2. The buffer memory device according to claim 1, wherein said first addressing means comprises
first clock generating means responsive to the first rate of said first device for generating first clock signals, and
first counter means responsive to the first clock signals for performing a first counting operation to output first address signals for the first accessing operation,
said accessing means being responsive to said first address signals to perform the first accessing operation to the section addressed by said first address signals; and said second addressing means comprises
second clock generating means responsive to the second rate of said second device for generating second clock signals, and
second counter means responsive to the second clock signals for performing a second counting operation to output second address signals for the second accessing operation,
said accessing means being responsive to said second address signals to perform the second accessing operation to the section addressed by said second address signals.

3. The buffer memory device according to claim 2, wherein said first and second address signals outputted from said first and second counter means each include a plurality of bits,
said control means operating in response to upper order bits included in said plurality of bits of said first and second address signals.

4. The buffer memory device according to claim 1, wherein said first device comprises a computer system, and said second device comprises a digital audio tape recorder memory.

5. The buffer memory device according to claim 1, wherein the first accessing operation by said accessing means includes a writing operation or a reading out operation,
the second accessing operation by said accessing means includes the writing operation or the reading out operation which fails to be performed by the first accessing operation.

6. A method for operating a buffer memory device connected between a first device and a second device operating at mutually different first and second rates of data transmission and reception respectively, and adapted for synchronizing data transmission and reception between said first and second devices, the first rate of said first device operating at a lower rate of data transmission and reception than the second rate of said second device, said buffer memory device comprising a memory area for storing data, said memory area being divided into a plurality of addressable sections, said method comprising the steps of:

(a) periodically addressing each of the addressable sections in said memory area responsive to the first rate of said first device;

(b) periodically addressing each of the addressable sections in said memory area responsive to the second rate of said second device;

(c) performing a first accessing operation to the addressable section in said memory area addressed at said step (a);

(d) performing a second accessing operation to the addressable section in said memory area addressed at said step (b);

(e) detecting a coincidence of said first and second accessing in the same addressable section of said memory area;

(f) detecting a difference between the addressable sections of said memory area having said first and second accessing operations;

(g) stopping said second accessing operation performed at said step (d) when said coincidence is detected in the same addressable section in said memory area at said step to thereby avoid an undesired addressing collision caused by simultaneous addressing by said steps (a) and (b) in the same addressable section of said memory area; and (h) starting said second accessing operation after stopping at said step (e) when said difference of said addressable sections is detected to be a predetermined difference at said step (f) corresponding to at least two addressable sections of said memory area.

7. A method according to claim 6, wherein said step (a) comprises the steps of:

generating first clock signals in response to the first rate of said first device, performing a first counting operation to output first address signals for the first accessing operation in response to said first clock signals, and performing the first accessing operation to the section addressed by said first address signals; and said step (b) comprises the steps of generating second clock signals in response to the second rate of said second device, performing a second counting operation to output second address signals for the second accessing operation in response to said second clock signals, and performing the second accessing operation to the section addressed by said second address signals.

8. The method according to claim 6, wherein the first accessing operation performed at said step (c) includes a writing operation or a reading out operation and the second accessing operation performed at said step (d) includes the writing operation or the reading out operation which fails to be performed by the first accessing operation.

* * * * *